(12) United States Patent
Lipner et al.

(10) Patent No.: US 7,085,607 B2
(45) Date of Patent: Aug. 1, 2006

(54) CONTROL SYSTEM DISPLAY FOR MONITORING A COMPLEX PROCESS

(75) Inventors: Melvin H. Lipner, Monroeville, PA (US); Roger A. Mundy, North Huntingdon, PA (US)

(73) Assignee: Westinghouse Electric CO, LLC, Pittsburgh, PA (US)

( * ) Notice: Subject to any disclaimer, the term of this patent is extended or adjusted under 35 U.S.C. 154(b) by 562 days.

(21) Appl. No.: 10/245,998

(22) Filed: Sep. 17, 2002

(65) Prior Publication Data

US 2003/0060899 A1 Mar. 27, 2003

Related U.S. Application Data

(63) Continuation-in-part of application No. 60/323,845, filed on Sep. 21, 2001.

(51) Int. Cl.
*G05B 15/02* (2006.01)

(52) U.S. Cl. .............................. 700/9; 700/11; 700/17; 700/32; 700/83

(58) Field of Classification Search .................... 700/9, 700/11, 17, 32, 83; 376/216
See application file for complete search history.

(56) References Cited

U.S. PATENT DOCUMENTS

| 4,430,707 | A | * | 2/1984 | Kim ........................... 718/100 |
| 4,679,135 | A | * | 7/1987 | Kobayashi et al. ........... 700/17 |
| 4,803,039 | A | | 2/1989 | Impink et al. |
| 4,815,014 | A | | 3/1989 | Lipner et al. |
| 5,253,186 | A | * | 10/1993 | Lipner et al. ............... 702/182 |
| 5,553,304 | A | | 9/1996 | Lipner et al. |
| 5,881,115 | A | | 3/1999 | Lipner et al. |
| 6,473,101 | B1 | * | 10/2002 | Grigor et al. ............... 715/784 |
| 6,780,105 | B1 | * | 8/2004 | Kaminkow .................. 463/16 |
| 6,788,319 | B1 | * | 9/2004 | Matsumoto et al. ........ 715/841 |

* cited by examiner

*Primary Examiner*—Thomas Pham

(57) ABSTRACT

A system for controlling a complex process in which a supervisory sequential controller interface provides automatic sequencing of a plurality of sequential steps of a procedure for operating the complex process, and a display in dynamic communication with the supervisory sequential controller interface and responsive thereto, displays an overview of the status of progression through the sequential steps relative to the entire process. The display provides a global view of the status of the procedure identifying the state of substantially each criterion that needs to be satisfied to advance to the next sequential step and providing verification that substantially each command to be given upon satisfaction of the criterion, has been executed.

25 Claims, 4 Drawing Sheets

FIG. 4

CONTROL SYSTEM DISPLAY FOR MONITORING A COMPLEX PROCESS

CROSS REFERENCE TO RELATED APPLICATION

This application is a Continuation-in-Part of Application Ser. No. 60/323,845, filed Sep. 21, 2001.

BACKGROUND OF THE INVENTION

1. Field of the Invention

This invention relates to a system for aiding an operator in executing step by step procedures during the operation of a complex process. More specifically, this invention relates to a display system that provides an overview of the outcome of executing the criteria for sequentially processing the steps of a method for controlling a complex process.

2. Related Art

Operation of a complex process facility requires the assimilation of a large amount of data and evaluation of the status of the process and the various component systems from those data, and informed, decisive action based upon such evaluation. While much of the operation of a modern complex process facility is automatically controlled, overall supervision of the facility is always the responsibility of a human operator.

Typically, formal written plant operating procedures under either normal or emergency conditions are developed by experienced specialists. Such "paper" procedures have been used for many years, particularly in facilities such as nuclear power plants. Recently, interactive computer-based systems for aiding the operator in the execution of complex operating procedures have been developed. For instance, U.S. Pat. No. 4,803,039 discloses such a system in which the sequential steps of a procedure are presented to the operator on a display screen. The system automatically monitors the appropriate parameters relevant to the steps of the procedure. Where conditions required by certain steps are not satisfied, alternatives are offered to the operator. In either case, a response is required from the operator before the system advances to either the next step or a step in another procedure commanded by the operator. U.S. Pat. No. 4,815,014 describes a related system that requires verification that an operator action has, in fact, been taken before it will advance to the next step in the procedure. The operator, however, may override the requirement for such verification. The interactive systems described to this point were hard coded, therefore requiring the writing of new code and verification of all of the software when any changes were to be made, including altering of reference values of the various parameters. U.S. Pat. No. 5,553,304 overcomes this particular problem by describing the use of a relational database to generate and store equations representing the various sequential steps in the procedures. With such a system, changes can be made in the pertinent parameter values and even in the procedures themselves without the necessity to generate new code and verify the codes so generated.

However, the interactive computer-based systems for assisting in the execution of complex process procedures described in the foregoing patents require manual input by an operator to advance to a next step. They also only provide the ability to have one procedure active at a time. If the operator accepts a recommendation to transfer to another procedure, the exited procedure becomes inactive.

With the complexity of process facilities, such as especially nuclear power plants, increasing there is a particular need for an improved system and method for accurately and expeditiously executing procedures in a complex process facility. U.S. Pat. No. 5,881,115 satisfied this need by providing a supervisory, sequential controller interface for automatically sequencing through the sequential steps of such procedures. The supervisory, sequential controller also provides an operator interface presenting to the operator a representation of the sequential steps as they are executed, which permits the operator to selectively assume manual control of the procedures. A relational database forms the core of the system and is used to generate equations representing the sequential steps, which are then automatically or manually executed.

Starting conditions for automatic execution of the procedures are established so that upon satisfaction of these conditions, the procedure is initiated automatically. Stop conditions for automatically stopping a procedure can also be established.

Some of the procedural steps generate control signals which result in modification of process conditions, e.g., the opening and closing of valves, the stopping or starting of pumps, etc. Such control signals are automatically generated by a procedure which is running automatically. Some procedures call for verification that the control signal has been effective before advancing to the next step. In some instances, this may take some time. If the condition is not satisfied, the step is violated and the automatic sequencing will terminate, requiring operator intervention. A suitable time delay is provided to allow the command signal to take effect so that the process may continue automatically. Time delays are also programmed into some of the steps of the procedure so that the operator may follow the sequence of steps during automatic execution.

The system described in U.S. Pat. No. 5,881,115 also includes the ability to sequence through the steps of multiple procedures simultaneously and make available to the operator, through the operator interface, representations of the sequential steps of each of the multiple procedures as they are being executed. An important feature of the system is the operator interface which is comprised of two parts: An executive interface and a procedure interface. The executive interface allows the operator to view and select the status of each of the procedures. The executive interface also allows the operator to globally select automatic sequencing so that as the start conditions are met for the various procedures, they are automatically initiated. The procedure interface presents a representation of the current step of the selected procedures. The current steps of multiple procedures can be presented in separate windows.

While the system that evolved out of the inventions described in U.S. Pat. Nos. 4,803,039, 5,553,304 and 5,881,115 contributed significant advances to the control of very complex processes, automatic control of those processes created a need for the operator to have a greater understanding of the criterion employed for advancing each of the steps of the process and of the satisfaction of the criterion, and verification that the commands issued as a result of satisfaction of the criterion have been carried out for each of the steps of the process, without sacrificing a global view of the steps of the procedures that are running.

There is a particular need for such a system that readily enables the operator to assimilate that information at one time for substantially all the related procedures that are running for that process.

SUMMARY OF THE INVENTION

These needs and others are satisfied by the system of this invention which provides a global display which is in dynamic communication with the supervisory sequential controller interface and responsive thereto to display an overview of the status of progression through the sequential steps of a procedure controlling the complex process relative to the entire process. The display of this invention identifies substantially each criterion that needs to be satisfied to advance to the next sequential step and provides verification that substantially each command to be given upon satisfaction of the criterion, has been executed. The progression of the steps, identification of the criterion, an indication of which criterion have been run and not satisfied, and verification of which commands have been successfully executed for each related procedure controlling the process are shown in a single view at the same time.

Preferably, the detailed steps of a primary procedure are shown as a center column of blocks in a display matrix on one region of the display. Each block in the center column of this matrix represents a sequential step in the process and will illuminate when its criterion are being executed. Within the matrix, on one side of the center column and in the same row corresponding to that step, are set forth abbreviations or codes for the criterion that has to be satisfied for that step to be satisfactorily completed. Each block within a row in this portion of the display entitled "Primary Criteria" represents a separate criterion, a description of which can be viewed by clicking the appropriate block with a mouse. A corresponding criterion block will light if the criterion it represents is not satisfied. Within the matrix, on the other side of the center column for each step, is displayed the secondary criteria that represent the parameter and component states that should exist after the completion of the commands issued as a result of the fulfilled primary criteria. A secondary criteria block will light if the criterion that it represents is not satisfied within a prescribed period of time. Only after all the criteria within a row has been satisfied will the center column advance to the next step by illuminating the next lower block in the matrix.

In the preferred embodiment, some of the primary criterion that, if not successfully executed, may indicate an unstable state for the process, are automatically programmed, if not successfully executed, to return the process to a stable state. These criterion are highlighted, such as by color-coding on the display. If the remaining primary criterion are unsuccessfully executed, the process will stop for operator intervention.

Typically, the execution of a preselected number of steps will indicate a change in the operating mode of the process, identifying that a discrete operating state had been achieved. Soft buttons are provided on the display, preferably aligned with the steps at which the corresponding mode is achieved. By pressing a given mode button, the programmed steps of the process will advance until that mode is achieved, assuming all criterion are executed successfully. When that mode is achieved, the soft mode button corresponding to the operating state pressed will illuminate.

Parallel running processes can be shown in a similar manner on other regions on the display. Preferably, the return step sequences that are followed, if one of the primary criterion that would issue a return command is not satisfied, or if a lower operating mode is selected, is shown on a separate matrix with each block representing a corresponding step identified by a coded indication. The blocks in the return matrix light as the return sequences are executed.

Still, another area on the screen displays a matrix with each of the identified blocks corresponding to a return criterion representing a change in the state of the process that should be achieved if the corresponding return step is successful, to confirm that the return step was successfully executed. The corresponding return criterion block lights will illuminate if the criterion is not successfully executed within a specified period of time during the return sequences.

The display is preferably also provided with a number of control buttons that will place the supervisory sequential controller interface in a manual or automatic state, place the supervisory sequential controller interface in an advisor or commanding role and cause the supervisory sequential controller interface to perform a search function, and refresh the display. In the manual state, the operator is required to advance the steps in order for the process to sequence. In the automatic mode, the supervisory sequential controller interface will advance the steps if the respective criterion are satisfied. In an advisor role, the procedure can proceed to sequence either manually or in the automatic mode as stated above, but no commands will automatically be issued. In the command mode, commands as programmed will automatically be sent. The search button has the system review all the criteria and identify the step that the process is currently in. A clear button serves both to refresh the display and to acknowledge any alarm conditions. A process status field can also be provided to identify the state of the process and show, for example, when it is complete.

In this way, the operator gets a global view of the procedure and the state of every criterion underlying the sequential steps that are to be taken, in a single view. Thus, the operator is provided with more information that can be assimilated in a shorter period of time, so the operator can make better decisions. Thus, the operator is better able to administer the system running in an automatic mode.

BRIEF DESCRIPTION OF THE DRAWINGS

A full understanding of the invention can be gained from the following description of the preferred embodiments when read in conjunction with the accompanying drawings in which:

FIG. 4 illustrates an exemplary screen of the global display of this invention.

DESCRIPTION OF THE PREFERRED EMBODIMENT

Figure 1:
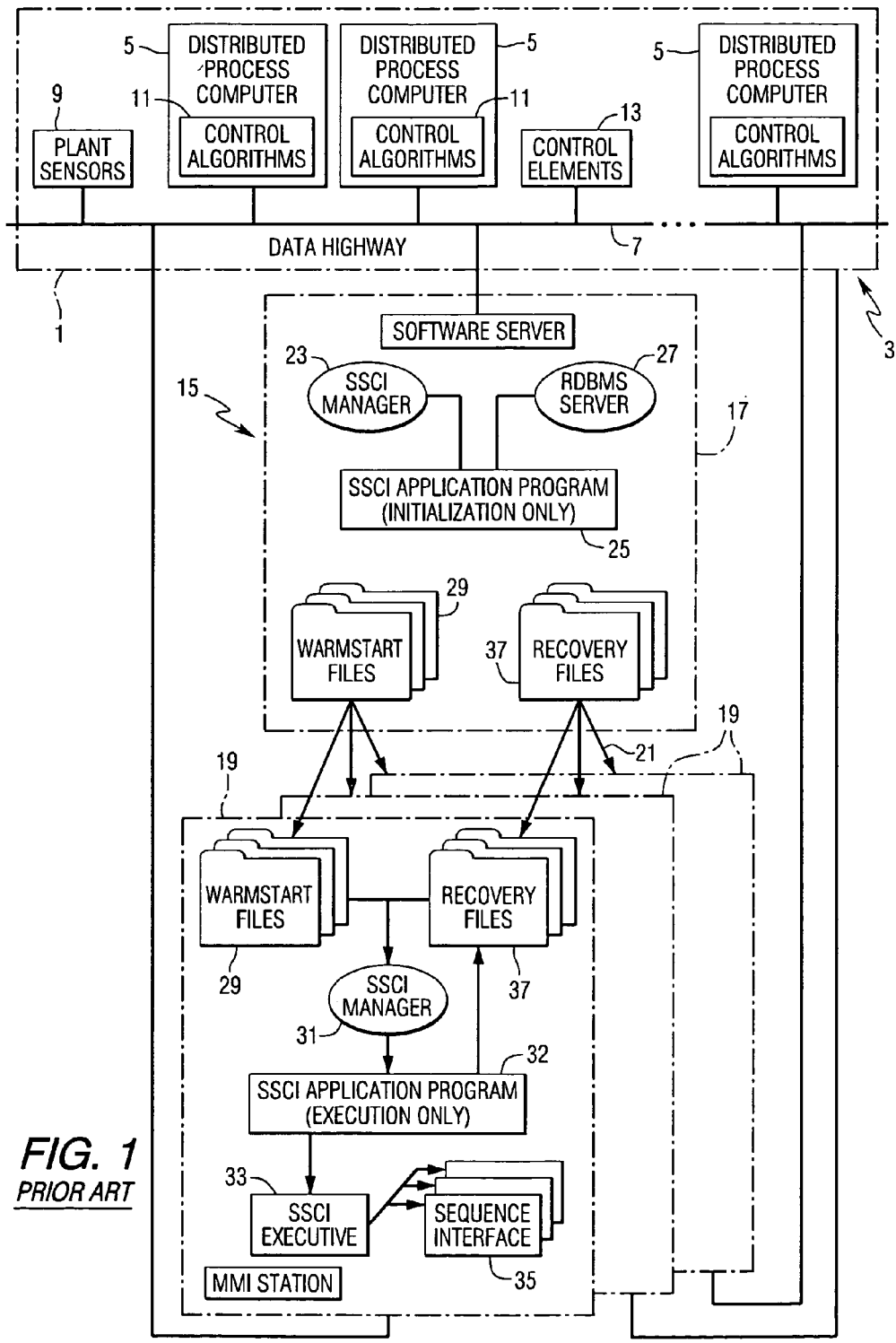
FIG. 1 is a schematic diagram of a prior art interactive computer-based system that can be employed with this invention.

FIG. 1 illustrates a complex process facility 1, such as a nuclear power plant, which is controlled by a distributed process control system 3. This distributed process control system 3 includes a number of distributed process control units (DPUs) 5 which are interconnected by a data highway 7. Plant sensors 9, which monitor various conditions and parameter values in the plant, provide plant data to the DPUs 5 over the data highway 7. DPUs 5 have distributed process computers which utilize the sensed plant conditions in control algorithms 11 to generate control signals which are transmitted over the data highway 7 to control elements 13 such as valves, pumps and the like.

A supervisory sequential controller interface ("SSCI") system 15 provides an interface which allows for both user-paced (manual) and system-paced (automatic) procedure and sequence monitoring. The SSCI system is an online work station-based system designed for plant operating procedure and sequence control applications. As used throughout, procedures and sequential control steps are considered interchangeable terms. Signals are both received from and transmitted to the plant-wide data area highway 7 by the SSCI 15. The SSCI 15 includes a software server 17 and a number of man machine interface stations or work stations 19. The work stations 19 communicate with the SSCI server 17 over a network 21 such as an ethernet. They also are connected to the data highway 7. The SSCI server 17 includes an SSCI manager 23 which controls implementation of an SSCI application's program 25 during initialization. The SSCI server 17 also includes a relational database management system (RDBMS) server 27. The RDBMS server 27 hosts the software which generates and stores the equations representing the sequential steps of the procedures. This process is more fully described in U.S. Pat. No. 5,553,304.

The SSCI application's program 25 generates a set of warm start files 29, which are transmitted to the work stations 19. These files contain the steps for the plurality of procedures. Another SSCI manager 31 in the work stations 19 utilizes the warm start files 29 to initiate operation of the SSCI application program 32, which executes the SSCI function at the work station. This application program 32 implements the two parts of the SSCI, the SSCI executive interface 33 and the sequence interface 35. The work stations 19 maintain recovery files 37 which continuously record the progress of the multiple procedures being executed. These recovery files 37 are transmitted back to the software server 17 so that if a work station 19 fails, execution of the procedure can be picked up by another work station 19 from the point just before the failed work station ceased operation. This precludes the necessity to restart a procedure all over again in the event of a failure of a work station.

The operators primary roles are to monitor the progression through the selected plant procedures while maintaining a clear picture of the plant state, to take control actions on the control board when they are required, and to watch for unsafe plant conditions. The operator retains both authority and responsibility for power plant operation. The SSCI 15 is designed to enhance the operators ability to perform these functions.

Figure 2:
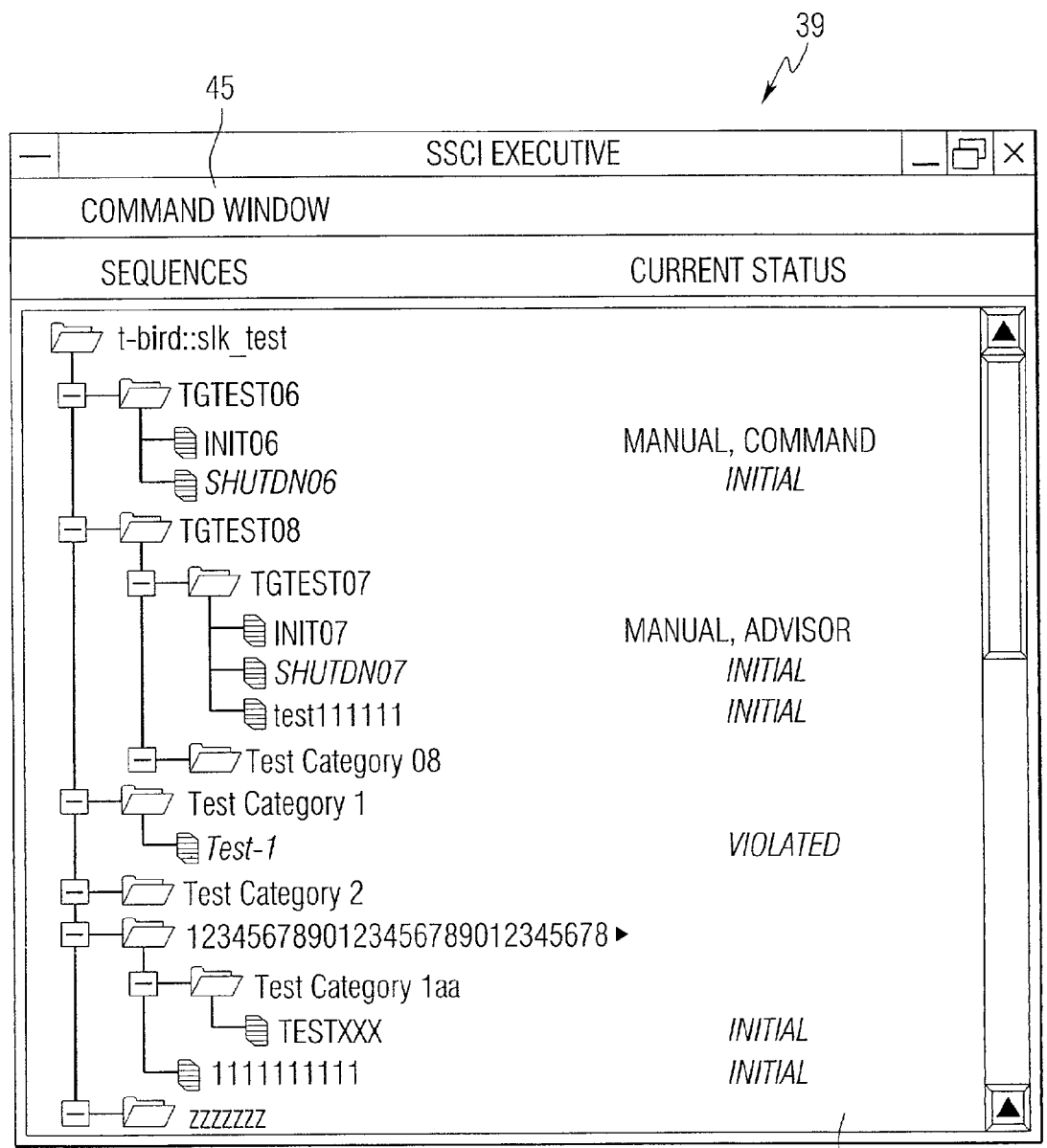
FIG. 2 illustrates an exemplary screen of the prior art executive interface which is generated by the system of FIG. 1.

The executive interface 33 provides the operator with the ability to exercise global control of all of the procedures. An example of the executive interface screen 39 is shown in FIG. 2. The executive interface screen 39 is arranged such that the procedures 41 are arranged in a tree structure down the left side of the main section of the screen 39. The procedures 41 are grouped as determined by the data entered in the relational database management system 27 through a sequence builder tool in the manner described in U.S. Pat. No. 5,553,304. The operator may scroll through the entire list of procedures and choose those procedures to be started. As previously mentioned, one of the important features of this system is that multiple procedures can be run simultaneously. The current status or mode of each procedure is presented on the right side of the main part of the screen 39. Another important aspect of the system is that the procedures can be run manually or automatically. In the "manual" mode, the SSCI presents a current step to the operator and verifies the current conditions as required for certain of the steps. The operator, however, must initiate progression to the next step. In the "automatic" mode, the SSCI will advance to the next step if the pertinent conditions are verified. If the conditions are violated, however, the procedure will transfer to a "violated" mode, which requires operator action. In FIG. 2, some of the procedures are in an "initial" state, ready to start. When a procedure has been completed, it will be placed in a "completed" mode.

Some procedures call for the activation of plant control elements 13. In some situations, it is desired that these actions not be taken. In those instances, the procedure can be placed in an "advisory" mode. If the control elements are to be actuated, as required, the procedure can be placed in the "command" mode. Thus, as seen in FIG. 2, one of the procedures is in a "manual, command" mode and another is in the "manual, advisor" mode. In the upper portion of the executive interface screen 39 are the SSCI control buttons 45. These are soft switches which permit the operator to reset or stop all of the procedures or, alternatively, to exit the SSCI application. Another control button can be made available to allow the operator to recover files that would be generated from a failed workstation.

Procedures can be automatically started when preselected start conditions develop. These start conditions can be easily set up and modified using the relational database management system 27. One of the available control buttons on the executive interface permits the operator to select or override automatic starting of the procedures. Automatic stopping conditions can also be entered and modified through the relational database management system 27. When the appropriate conditions are present, a procedure will automatically revert to the stopped mode. It can be appreciated that the executive interface 33 provides the operator with overall view and control of the multiple procedures available.

Figure 3:
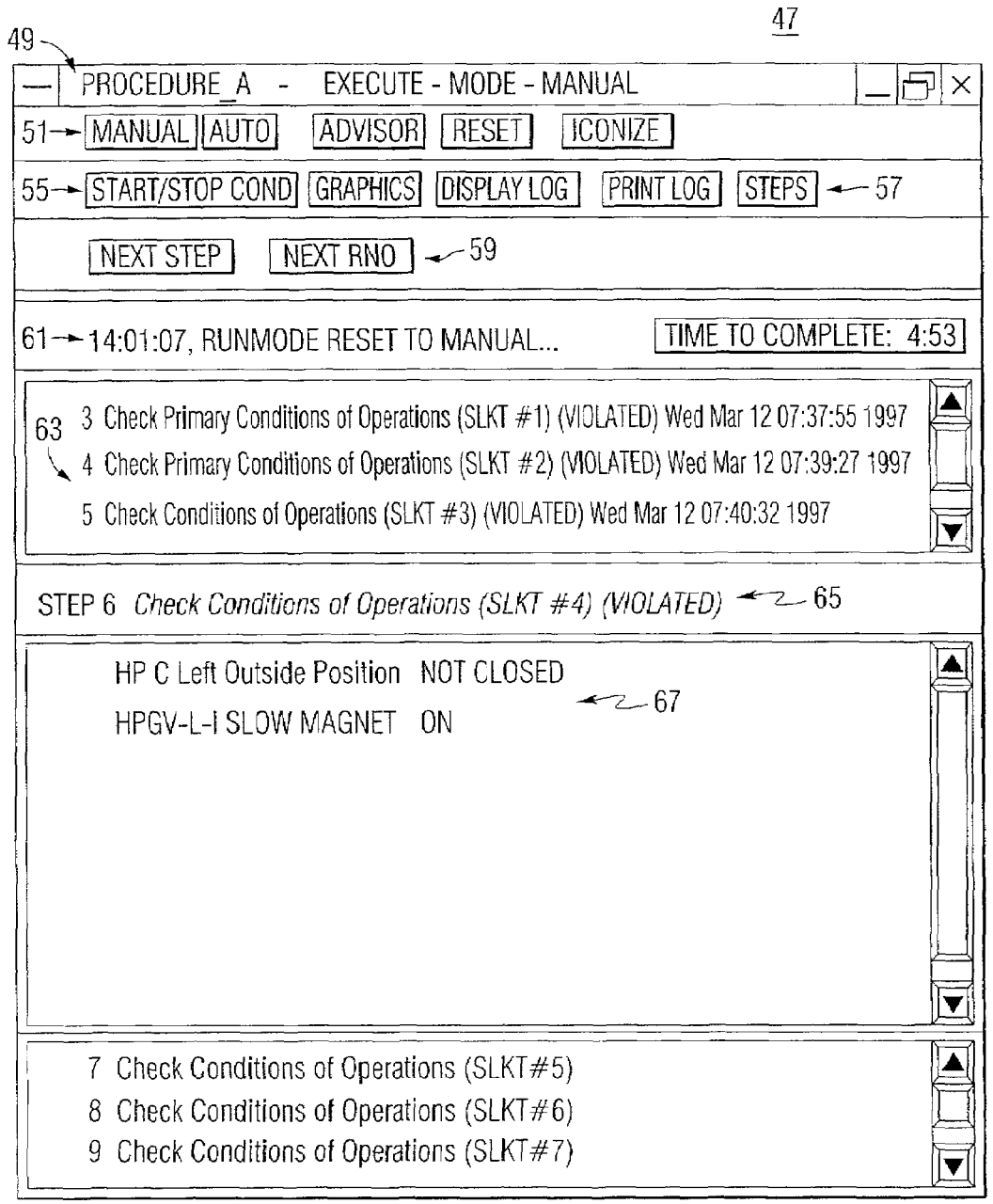
FIG. 3 illustrates an exemplary screen of the prior art procedure interface which also forms part of the system shown in FIG. 1.

The operator may select any of the procedures from the executive interface screen 39 for detailed viewing or for manual control. This brings up the procedure interface screen 47, which is shown in FIG. 3. This screen is arranged such that the operator may ascertain the relevant information about the procedure, including what mode the procedure is currently in, whether it is in manual or automatic control, and what is the current step of the procedure. Of primary interest are the relevant states of the components and parameters of the current step of the procedure, which are displayed textually as well as with color coding.

Procedure interface screens 47 of multiple procedures may be displayed simultaneously, such as where several procedures are being executed at the same time. The multiple procedures may each be displayed in a small window, or any one or more may be iconized, to be displayed at the operator's request.

Starting from the top of the procedure interface screen 47, the top line 49 displays the title of the procedure that is running and the mode that it is in. Proceeding down on the procedure interface screen 47, the next section of the screen is reserved for mode selection buttons 51 such as "manual", "auto" and "command/advisor". The operator uses these buttons to establish the conditions under which the procedure is to be implemented.

To the right of the mode selection buttons are the sequence control buttons 53: "reset" and "iconized". The "reset" button allows the operator to reinitialize the procedure and start again. The "iconized" button allows the operator to dismiss the current procedure from the workspace. However, it will remain in whatever mode it was in at the time, and the operator may display it again by using the executive interface screen 39.

The next section on the procedure interface screen contains the sequence information buttons 55 with which the operator can control what additional information is displayed. The "start/stop condition" button will display the procedures starting/stopping condition information. The "graphics" button will allow the user to display an existing graphic, which has been associated with the current step in the procedure. The "display log" button allows the operator to display a short version of the log, which has been created by the system. This log will enable the operator to view the pathway taken by the procedure up to the current point in time. The "print log" button allows the user to send the short log to a line printer (not shown) with which the workstation 19 is connected.

To the right of the sequence information buttons 55, is the "steps" button 57 which will produce a sequence step list of the steps in the procedure with which the operator may select any step to be implemented, even if it is outside of the expected path through the sequence.

The next area of the screen is reserved for the use of prompts 59. These prompts will be displayed as they are pertinent for a given procedure step; however, they will not be used unless the system is in "manual" mode. The prompts 59 will, for example, direct the operator to the next relevant step in the procedure, allow the operator to branch around steps, either forward or backward, and allow the operator to display alternate conditions of operation, if they exist for that step. The expected operator prompt will be highlighted by the SSCI 15, whether the system is in "manual" or "automatic" mode. In this way, the operator will see what the system expects the next action to be. However, when in "manual" mode, the operator will be able to choose whatever action he believes is appropriate, even if the action is different from that expected by the system. The operator is always in control of the SSCI 15. The next step in the procedure interface screen 47 is the message area 61 where information concerning procedure starting/stopping conditions, for example, will be displayed. The timers associated with steps are also displayed here.

The remainder of the procedure interface screen 47 is used for display of the current procedure. First, the steps that have been implemented are shown in scrollable area 63. The status of the step when it was exited is shown, as well as the time at which it was exited. Next, the current procedure is displayed at 65. The status of the relevant plant components and parameters for the step are displayed at 67. This is an active area, and any changes to the plant either through operator or plant induced actions, will be clearly visible in this area, since the plant data is updated. This area is also scrollable, except that the high level statement representing the purpose of the step is always shown. The upcoming steps are displayed in a scrollable area 69, allowing the operator to view what conditions and/or actions are expected in the future.

In the example of the procedure interface screen 47 shown in FIG. 3, "procedure A" is the active procedure, and it is being implemented in the "manual" mode. Step 6 is the current step. This step involves checking conditions of operation of the SLKT #4. The relevant parameters to do so are the HPC, left outside position, which is to be CLOSED, and the HPGV-L-I SLOW MAGNET, which is to be ON. Therefore, at the time shown, step 6 is not satisfied, a period of 4 minutes and 53 seconds remain for the step to become satisfied. When it becomes satisfied, the user will push the "next" button to manually advance to step 7. If the step is not satisfied after the time period, the operator will either attempt to satisfy the necessary conditions or he or she may manually proceed to step 7. However, when the operator does so, the system will provide a popup confirmation notice to the operator to insure that the operator does indeed want to continue even though the process parameter conditions are not satisfied.

Therefore, while the executive interface and the procedure interface can provide all the information about the process, including the criteria that must be satisfied for the successful execution of each step of the procedure and verification that the commands that are issued as a result of the execution of each step have actually been carried out, that information is not supplied on a single screen in the context of the entire procedure, and those of concurrently running related procedures, in a manner that will enable the operator to readily assimilate the information. This invention provides a third human interface that enables the operator to so readily view the information.

When used hereafter, the term "primary criteria" refers to the conditions that must be satisfied in order for the procedure to move on to the next step. Thus, in the example more fully described with regard to FIG. 2A of U.S. Pat. No. 5,553,304, the illustrated step in the procedure would be "1. Verify SG tube rupture" and the primary criteria would be that "a. Pump A is running", "b. Pressurizer level is greater than 50%", and "c. SG pressure is less than 1000 psia". If those criteria are verified, commands would be issued that might involve opening or closing valves or turning on or off pumps. The secondary criteria would then be the readout from the sensor on the valve that showed the state of the valve and the output of the sensor on the pump that showed whether the pump was turned on or off.

Figure 4:
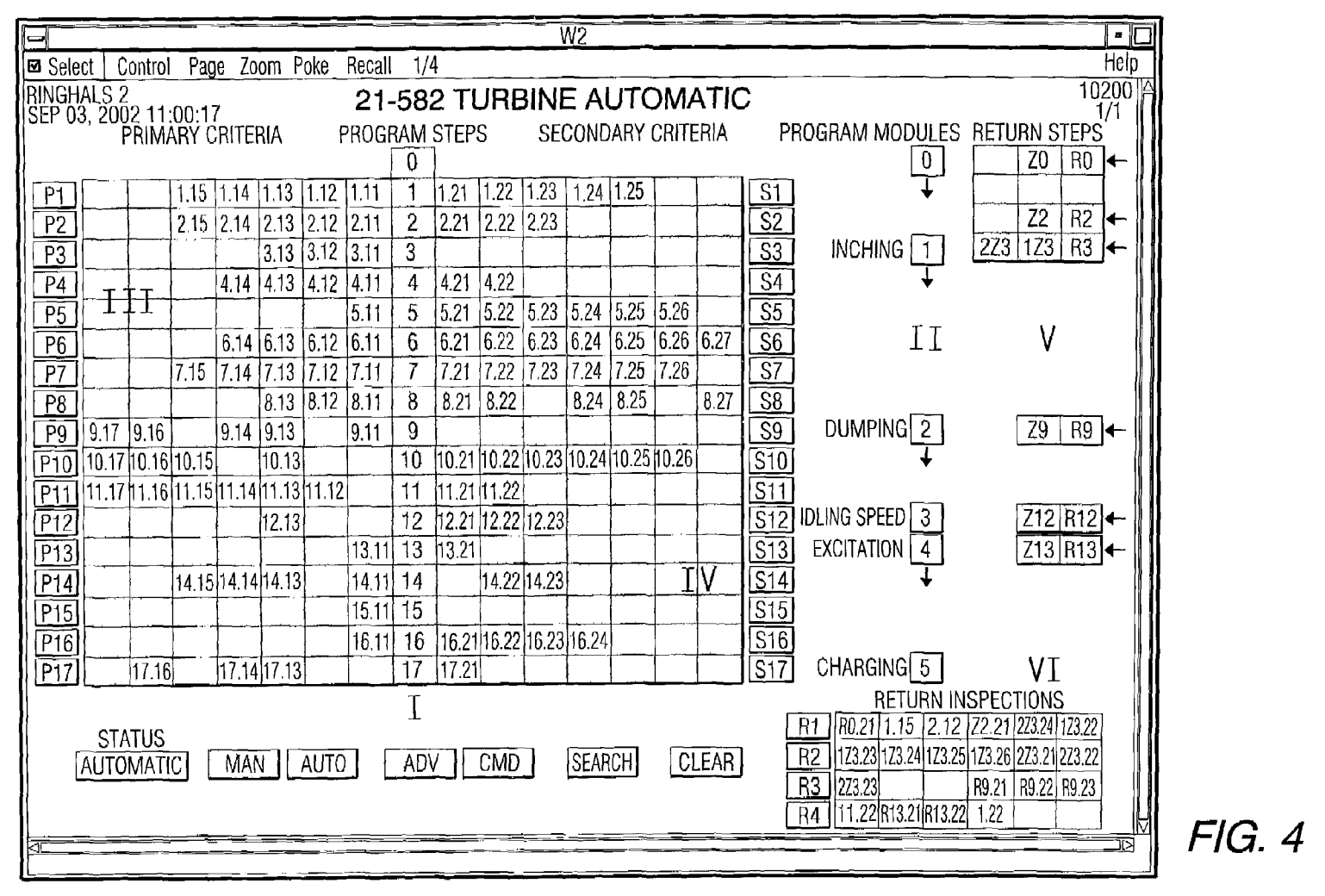

FIG. 4 illustrates the display of this invention which is shown applied to an automatic turbine control system though it could as well be applied to the processes on the primary side of a nuclear reactor plant or any other complex process. This invention requires that additional information that can be obtained from the relational database management system, in the form of the issuance of states that represent the satisfaction of steps and substeps of the relevant sequence of the procedural steps being executed, be placed on the data highway to be communicated to the plant information system, where the data is subsequently read by the display illustrated in FIG. 4. As part of the sequential controller database, the parameters that are to be transmitted to the plant information system are defined. These parameters may be in analog or digital form, and they furthermore may be calculated; that is, they may be the result of any type of combinatorial logic ("AND" or "OR" logic) supported by the sequence controller system software as explained in U.S. Pat. Nos. 5,553,304 and 5,881,115. Once the parameters are defined, a text file is created, which lists the computer point identifiers that are to be outputted. At this stage, the sequential controller system will, at periodic intervals, update the values of the parameters on the plant information network. This is the same process that is currently employed to communicate the information displayed on the SSCI executive interface screen and the SSCI procedure interface screen.

The monitor of this invention, illustrated in FIG. 4, reserves a prominent portion of the display, in the upper left hand portion of the screen, for a matrix, represented by reference characters I, III and IV, to monitor the primary criteria and secondary criteria of the programmed steps of the process as they are executed for one of the main procedures monitored; in this case, automatic startup of a turbine.

The display shown in FIG. 4 is preferably always active and can be considered as the automatic turbine control system overview screen. This graphic display may be presented on the video display unit on a workstation that the operator chooses and takes advantage of the Ovation® graphics of the Ovation® distributed processing system sold by the Westinghouse Process Control, Inc., Pittsburgh, Pa. The colors employed can be tailored to the specific application and those referred to hereafter are merely provided as examples. Similarly, the primary criteria, number of steps and secondary criteria employed as well as the return steps and return criteria will vary in number and kind from application to application. The following preferred embodiment is only an example of an application of the display and control system of this invention to an automatic turbine startup system and, at times, concurrently running return procedure. It should be appreciated that the numerals employed in FIG. 4 have no correlation to the reference characters employed in FIGS. 1, 2 and 3 and their relevance will be explained hereafter. While FIG. 4 is illustrated in black and white, the colored sections and changes in color of the various blocks will be described in connection with the description of the corresponding blocks. Any reference to a block being lit or illuminated shall also be understood to mean any change in the shape, color or intensity of the block that would indicate a change in state of what the block represents.

Area I shown in FIG. 4 identifies a center column of buttons/lights on the matrix labeled 0–17. Each button in the center column represents a step in the sequence of the procedure. As the controller system executes the steps, these lights will become active, one at a time, showing the operators the current step of the sequence. When a step is active, it should indicate a shade of green that differentiates the step from the other inactive steps.

Area II, to the right of the matrix represented by reference numerals I, III and IV, identifies a column of six soft buttons/lights labeled 0–5. These represent the lights that illustrate to the operator the current operating mode of the sequence; that is, if steps 0–9 have been successfully completed, the sequence has achieved "dumping", which means a steam-dump has occurred. Essentially, as steps 1–17 are successively completed, the sequence achieves higher and higher levels of operation, represented by the words to the left of the lights in column II. Each light in column II is aligned horizontally with the step the completion of which achieves the operating mode represented by that light. These lights also serve as soft "buttons", through which the operator may select the mode the operator wishes to be in If the sequence is on step 3, in the "Inching" (the turning gear) mode, and the operator pushes button number 4, the sequence of steps will progress towards the mode "Excitation" in which the generator exciter is activated. The soft "buttons" in column IT can be individually programmed so they can only be activated if a predetermined number of steps have been sequenced or only prior to the sequencing of a pre selected number of steps. For example, the soft- "button" zero can only be selected in this application if the automatic turbine control system procedure is on steps 1, 2 or 3. The selected soft "button" light flashes (yellow) until the automatic turbine procedure step associated with the corresponding mode is reached, at which time it stops flashing and remains lit. If a different soft "button" in column II is selected manually, the previous "button" is deactivated and the new "button" flashes until the correct programmed step is reached. During a return procedure, which will be described hereafter, the current soft "button" in column II is deactivated. These "buttons" are normally white or off-white in color when not lit. Preferably, a confirmation window appears when a mode button is pushed, to reduce the possibility of an accidental activation by requiring the choice of a soft "button" to be a two step process.

Area III of the matrix comprises the boxes on the left of the central column of step lights represented by reference character I. These boxes in the area represented by reference character III contain lights that show the primary criteria that must be satisfied before the sequence will advance from step to step. The primary criteria is shown in the same row as the corresponding step and is contained in the boxes with the numbered designations. Alternately, the designations on the blocks can be any abbreviation, code or address which will refer back to the corresponding criterion. A description of the corresponding criterion can be accessed by clicking on a block or pressing the corresponding soft "button" P1–P17. A description of the corresponding criteria will be shown on a pop up window. However, most operators associate the specific criteria with the corresponding numbered designations in the blocks and do not require access to the descriptions. Certain of the criteria in this example, namely 2.12, 2.13, 3.12, 3.13, 11.11, 11.12, 11.13, 11.14, 14.11 and 15.11 are parameters that, if not fulfilled may indicate that the process is in an unstable state and will cause a "return" sequence to initiate to return the process to a safe mode of operation. These parameters are designated in red. The remaining parameters are identified in black and, if not fulfilled, will cause the sequence to stop, allowing the operator time to investigate the problem. Any criterion that is not satisfied will cause the appropriate light to activate, giving visual information to the operator that something is wrong. An audible alarm can also be activated if the primary criteria are not satisfied for a step.

The primary criteria blocks are normally white or off-white in color and can be activated by the operator through the right click of a mouse to bring up a menu that allows selection of point information, minitrends, a summary diagram or signal diagram or any other information that may be helpful to understand the status of the criteria. For example, the point information contains the description of the corresponding criterion mentioned previously. In addition, pop-up screens for each criterion may be displayed with the textual information that is desired. These pop-up displays are accessed by pressing the buttons labeled P1, P2, etc. . . . The state of the primary criteria blocks is given a gray background if satisfied or not checked. A block will flash with a yellow light if not satisfied and unacknowledged. The operator can enter an acknowledgement of the condition by pressing the "clear" soft button in the lower right center portion of the display. The corresponding block will maintain a steady yellow color if not satisfied and acknowledged. A block whose criterion was satisfied when previously not satisfied and unacknowledged will have a steady beige color. If the primary criteria causes a return procedure to run, the return program will execute. When it is finished, the operator pushes the "clear" button. This will cause any fulfilled primary criteria that were blinking before the return to stop blinking. If a primary criteria is not required after a return, the "clear" button will also cause the corresponding block to stop blinking.

The area of the turbine startup procedure matrix identified by reference character IV refers to the boxes to the right of the center column of step lights identified by reference character I. These boxes contain lights that show the secondary criteria that must be satisfied. These criteria represent the parameter and component states that should exist after the completion of the commands issued as a result of the fulfilled primary criteria. However, there is also another element involved here—that of time. Each secondary criterion has a tolerance time within which it must be satisfied; if it is satisfied within that time, the light does not go on. If it is not satisfied within the tolerance time, the light representing the condition starts to blink, signifying a problem. A secondary criterion light will not be lit if it is fulfilled or if it is not checked. If a secondary criteria is not fulfilled after the tolerance time, a signal is preferably sent to an audible alarm. The unfulfilled secondary criterion will cause the SSCI to stop (enter into manual operation) at the relevant step in the automatic turbine control sequence. Each of the blocks in the area represented by reference character TV that is programmed with a secondary criteria will have the same capability to provide the information noted for the blocks in the area represented by reference character III and the soft switches S1–S17 will function in a manner similar to that described for the soft switches P1–P17.

The area on the far right of the display, represented by reference character V, contains several matrices whose blocks represent return sequence indicators of the steps of a return procedure that will return the process to a safe mode of operation if one of the primary criteria, identified in red in area III of the display, is not satisfied. The return matrices are aligned horizontally with the program steps, identified by reference character I, to which they are applicable. In other words, if one of the criteria in steps 2 or 3 that is noted in red is not satisfied, then the return steps identified as Z9, R9, Z12, R12, Z13 and R13 will not be applicable. However, if the procedures had progressed past step 9, then the return steps Z9, R9 would be applicable in addition to those associated with steps 0, 2 and 3. These same procedures are followed if a lower operating mode is selected through the use of the soft "buttons" in column II. The return sequences help bring the plant back to a stable, safe operating condition. The boxes in the return matrices in area V light as the return sequences are executed. In this example, the return or intermediate steps are normally a "salmon" color. A change in color to red indicates that the active return or an intermediate step is in process.

The area in the lower right hand corner of the display, represented by reference character VI, shows the "return criteria" which, like the secondary criteria described above, must be satisfied within a specified period of time. These criteria are examined during the return sequences. The boxes blink if the item is not fulfilled within the tolerance time, during the period in which the return is being implemented. The return criteria blocks are normally white or off-white in color. Like the secondary criterion blocks, the return criterion blocks are not lit if the corresponding criterion is fulfilled or if it is not checked. Similar to that described above for the other criterion blocks, a brief description of the return criterion is available upon clicking on the relevant block. The soft "buttons" R1–R4 function similar to the function previously described for P1–P17. As in the case of the primary criteria and secondary criteria, if a particular return criterion is not satisfied, an audible alarm can be sent.

The control buttons are located along the bottom of the display. These buttons represent the search, manual/auto, command/adviser and clear functions.

The search function initiates a search, or localization process. The automatic turbine sequence must be inactive ("zero" mode) when the search is performed. A confirmation pop-up window requires two actions before the search is initiated. This button is lit while the search is being performed. When the search is completed, the button light goes off. The search examines all criteria and lights those criteria that have not been met to identify the state of the plant. The turbine sequence will be placed in the desired step as determined by the search process.

The manual/auto button allows the operator to place the automatic turbine procedure sequence in the automatic mode or manual mode. This will override the settings on the SSCI procedure interface screen, if those settings are different. The choice will be lit on the display. A confirmation pop-up window requires two actions before the choice of auto or manual is initiated to confirm the action was intended.

The command/adviser button allows the operator to place the automatic turbine procedure sequence in the command mode where output commands are issued or the adviser mode, which does not issue output commands. This will override the settings on the SSCI procedure interface screen, if those settings are different. The choice will be lit on the display. A confirmation pop-up window requires two actions before the choice of command or adviser is initiated.

The clear button performs the acknowledge function described above. A confirmation pop-up window requires two actions before the clear function is initiated.

Start and Stop buttons (Manual/Auto) are provided to allow the operator to manually start or stop the sequence, at the operator's discretion. In addition to these control buttons, an indication of the status is provided, i.e., AUTO, AUTO/DISABLED, MANUAL, VIOLATED, COMPLETE, ETC . . . , will be shown on the bottom left side of the display.

Accordingly, this invention enhances the automatic procedure sequencing system described in U.S. Pat. Nos. 5,553, 304 and 5,881,115 by providing the operator with an overall, global view of the status of the progression through the sequential steps of the procedure relative to the entire process. The display identifies the state of substantially each criterion that needs to be satisfied to advance to the next sequential step and provides verification that substantially each command has been executed, in a manner that the operator can readily assimilate. While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A system for controlling a complex process comprising:
    a supervisory sequential controller interface that provides automatic sequencing of a plurality of sequential steps of a procedure for operating the complex process; and
    a display in dynamic communication with the supervisory sequential controller interface and responsive thereto to display an overview of the status of progression through the sequential steps relative to the entire process, identifying the state of substantially each criterion that needs to be satisfied to advance to the next sequential step and providing verification that substantially each command to be given upon satisfaction of the criterion, has been executed, all of which is shown continually, at the same time, on a single integrated visual display when the display is active.

2. The control system of claim 1 wherein the display is also a control panel having a plurality of switches for directing the progression of the sequence of steps.

3. The control system of claim 2 wherein the progression through the sequential steps takes the process through a plurality of modes and said switches direct the sequence of steps from one mode to another.

4. The control system of claim 3 wherein each switch corresponds to one of the modes of operation of the complex process.

5. The control system of claim 3 wherein the switch corresponding to a particular mode will illuminate when the complex process is operating in the corresponding mode.

6. The control system of claim 1 wherein each of the steps in the sequence is represented by a distinct area "A" on the display that is illuminated when the step is executing.

7. The control system of claim 6 including one or more distinct areas "B" on the display on a first side of and visually associated with the corresponding distinct area "A", that respectively identify the criterion that has to be satisfied to move to the next step.

8. The control system of claim 7 wherein the corresponding distinct area "B" is illuminated if the identified criterion is not satisfied.

9. The control system of claim 7 wherein the corresponding distinct area "B" is illuminated if the identified criterion is not satisfied within a pre-selected time.

10. The control system of claim 9 wherein the pre-selected time is dependent on the time generally required to satisfy the criterion under normal operation of the complex process.

11. The control system of claim 7 wherein some of the distinct areas "B" identify the corresponding criterion by a first color code and others of the distinct areas "B" identify the corresponding criterion by a second color code and including means for returning the complex process to a safe mode of operation through return sequence steps if any of the criterion identified by the first color code are not timely satisfied.

12. The control system of claim 11 including means for stopping the sequencing of steps for operator intervention if any of the criterion identified by the second color code are not timely satisfied.

13. The control system of claim 7 including one or more distinct areas "C" on the display on a second side of and visually associated with the corresponding distinct area "A", that respectively identify the commands that will issue if the criterion in the corresponding distinct areas "B" are satisfied.

14. The control system of claim 13 wherein the corresponding distinct area "C" is illuminated if the identified command is not successfully executed.

15. The control system of claim 14 wherein the distinct area "C" is illuminated if the identified command is not successfully executed within a pre-selected time.

16. The control system of claim 11 including one or more substantially contiguous distinct areas "D" on the display that respectively identify the return sequence steps that bring the complex process back to a stable, safe operating condition if any of the criterion represented by the first color coded distinct areas "B" are not satisfied.

17. The control system of claim 16 wherein the distinct areas "D" are illuminated as the corresponding sequenced steps are executed.

18. The control system of claim 16 including one or more substantially contiguous distinct areas "E" on the display that respectively identify the commands that will issue from the sequenced steps identified in the distinct areas "D".

19. The control system of claim 18 wherein the corresponding distinct area "D" is illuminated if the identified command is not successfully executed within a pre-selected time during the period in which the return sequenced steps are being implemented.

20. The control system of claim 1 including means on the display for identifying whether the system is in a manual mode whereby the steps of the procedure are sequenced by an operator or in an automatic mode whereby the steps of the procedure are automatically sequenced by the supervisory sequential controller.

21. The control system of claim 1 including a start and stop switch which enables an operator to start and stop the sequencing of steps.

22. The control system of claim 1 including on the display an advisory and command switch that when in the advisory mode stops the control system from automatically issuing the commands.

23. The control system of claim 1 including a search button that searches through the criterion and identifies the last step to be executed.

24. The control system of claim 1 including a clear button that refreshes the display.

25. The control system of claim 7 where substantially each criterion is identified on the display by a coded abbreviation, including a soft button that activates a popup screen that provides text descriptive of the criterion represented by the corresponding abbreviation.

* * * * *